Aug. 21, 1956  H. E. SZADZIEWICZ ET AL  2,759,433
APPARATUS FOR MAKING DUMPLINGS
Filed Dec. 13, 1951  3 Sheets-Sheet 2
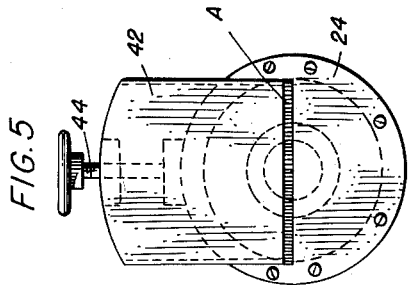
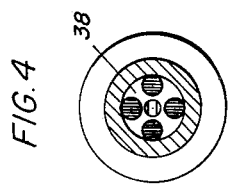
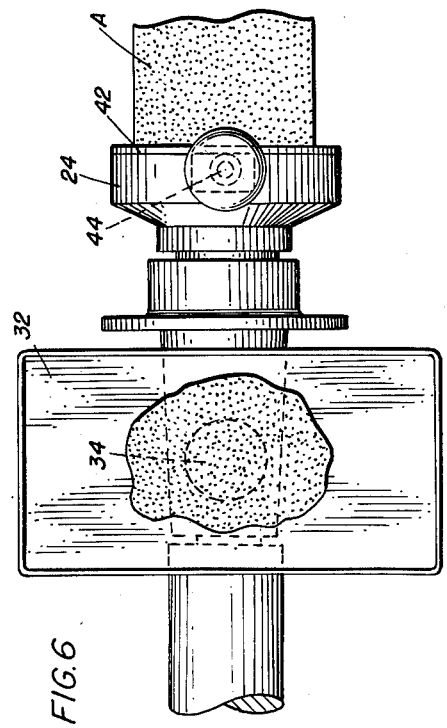
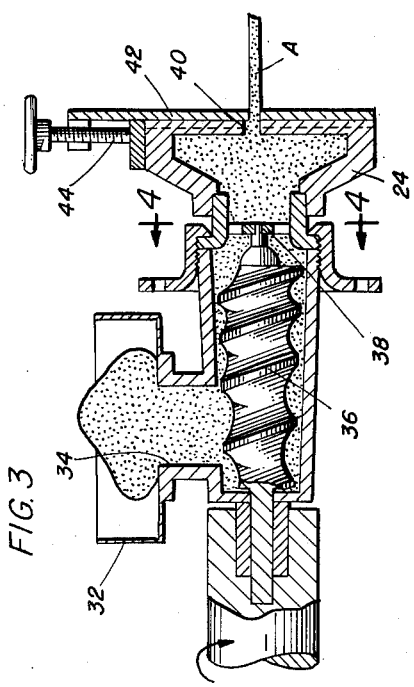
INVENTORS:
HENRY E. SZADZIEWICZ
HENRY KUBICKI
BY
ATT'Y Aug. 21, 1956   H. E. SZADZIEWICZ ET AL   2,759,433
APPARATUS FOR MAKING DUMPLINGS
Filed Dec. 13, 1951   3 Sheets-Sheet 3

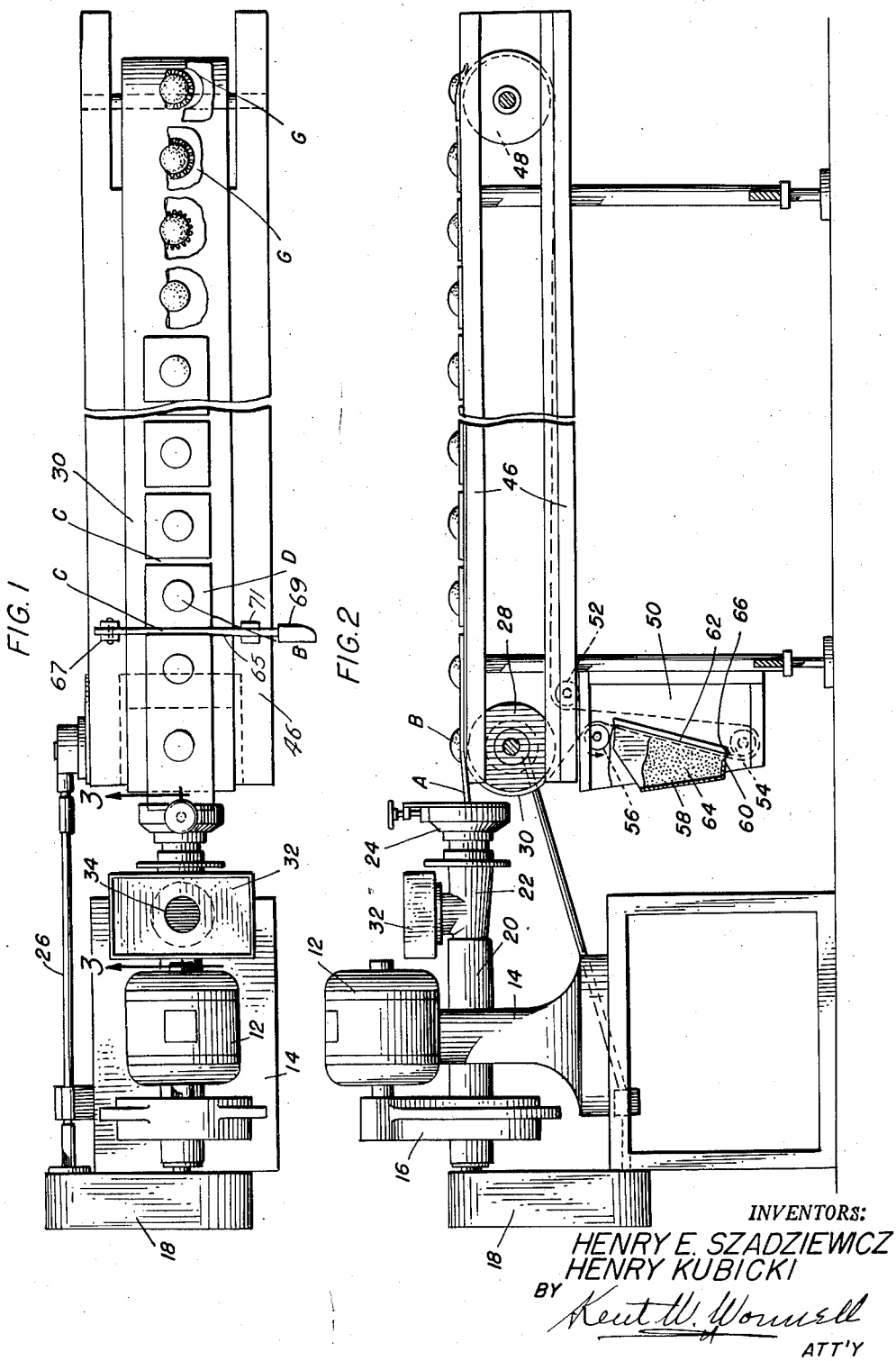

INVENTORS:
HENRY E. SZADZIEWICZ
HENRY KUBICKI
BY
ATT'Y

United States Patent Office 2,759,433
Patented Aug. 21, 1956

2,759,433

APPARATUS FOR MAKING DUMPLINGS

Henry E. Szadziewicz and Henry Kubicki, Chicago, Ill.

Application December 13, 1951, Serial No. 261,449

2 Claims. (Cl. 107—1)

This invention relates in general to the making of a dumpling consisting of a dough-like cover and a filler of meat, cabbage or other foodstuffs by a continuous process.

The invention includes the production of the cover by an extruding apparatus, the cutting, forming and shaping of the completed product and the apparatus for efficiently carrying out the operation.

An important object of the invention is to provide means for extruding a thin layer or ribbon of dough-like material in continuous form and controlling the thickness of this ribbon depending upon the product to be produced.

A further object of the invention is to provide means for coating the extrusion conveyor with flour or other material so that the cover does not stick to the conveyor.

A still further object of the invention is to provide means for forming the extruded material into sections of proper size and shaping the sections over a filler thereon to provide a completed dumpling of predetermined form.

A further object of the invention is to provide a new and improved method of operation whereby dumplings are continuously made by the extrusion of a pastry cover, loading the cover with an inner filling, flouring the extruded pastry strip and in forming, cutting, crimping and unloading the finished product.

Other objects of the invention will appear in the specification and will be apparent from the accompanying drawings in which, Fig. 1 is a plan view of an apparatus for making dumplings in accordance with this invention;

Fig. 2 is a side elevation of the apparatus shown in Fig. 1;

Fig. 3 is a sectional view of the extruder taken on the line 3—3 of Fig. 1;

Fig. 4 is a detail sectional view taken on the line 4—4 of Fig. 3;

Fig. 5 is a front view of the extruder shown in section in Fig. 3;

Fig. 6 is a plan view of the filling hopper and the extrusion head as shown in Fig. 3;

Figure 7:
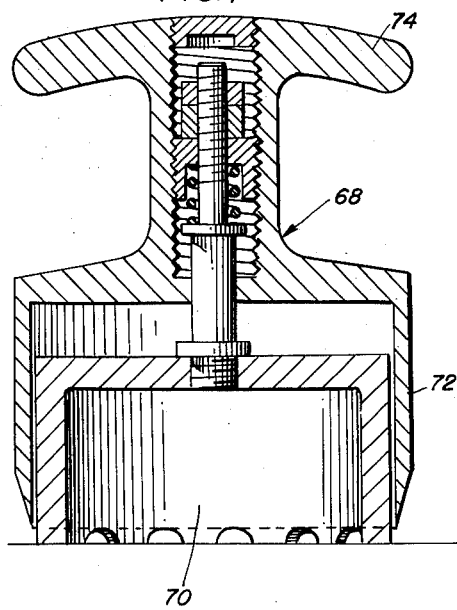
Fig. 7 is a sectional view of a combined forming, cutting and crimping device in one position.

In this method of producing a dumpling or pierogi, provision must be made for quickly and accurately changing the thickness of the pastry to cover the contents of the inner filling. Some fillings require thicker coverings in order to suitably hold fillings of different materials. In using dough-like covers in a continuous strip, it is necessary to prevent the cover from sticking to the conveyor, and in the present case, the conveyor in the form of a belt is coated with flour on one side thereof only so that the cover as extruded or in the form of a dumpling will not adhere to the conveyor.

Referring now more particularly to the drawings, an electric driving motor 12 is mounted upon a suitable standard 14 and is connected by a reduction gearing 16 with a transmission mechanism 18 which has a driving connection 20 with a food grinder 22 which is connected to an extruder 24.

The transmission mechanism 18 is also connected by a driver 26 for rotating a driving drum 28 for a conveyor belt 30.

The food grinder 22 has a hopper 32 into which dough and dough-like material is deposited with an opening 34 at the bottom of the hopper for feeding the material to a spiral impeller 36 at the bottom of the grinder. At the outer end of the grinder is a perforated plate 38 through which the ground material is forced into the extruder 24. The extruder is provided in its outer face with a horizontal slot 40 of greater width than usually required. To limit and control the thickness of a cover strip A of the extruded material, a gage plate 42 is mounted at the front of the extruder which is movable up and down by means of an adjusting screw 44 at the top of the extruder to vary the actual thickness of the extrusion slot so that the thickness of the extruded material A can be accurately controlled.

The present invention is described more particularly with the extruded cover in the form of a flat thin ribbon of material of six or seven inches or more in width.

The conveyor comprising the belt 30 is carried by the driving drum 28 at one end of a supporting frame 46 and by an idler drum 48 rotatably mounted at the other end of the frame. Below the drum 28 at the starting end of the frame is a receptacle 50 and pulleys 52, 54 and 56 for guiding the conveyor belt downwardly into the receptacle and upwardly therefrom around the driving drum 28 through a flouring device 58 which is mounted mostly within the receptacle 50, but is accessible from a front or outer end of the receptacle. The flouring device is a container with an opening 60 at the bottom through which the belt passes within closely against a back 62 inclined upwardly therefrom so that a powdered material 64 such as flour may be deposited in the top of the device 58 which will contact the belt therein as it passes from the opening 60 in contact with the back 62 and upwardly over the pulley 56 around the driving drum 28. This contact of the belt with flour or other material 64 will cause the material to adhere to one side only of the belt since the other side of the belt rests upon and makes sliding contact with the back 62. Any surplus material which adheres to the belt as it enters the device 58 through the bottom opening 60 thereof will be wiped from the belt below the bottom of the device by its contact with the sides of the opening. One side of said opening has a pointed lower extremity 66 at the bottom of the back which flexes the belt to assure dislodgement of the adhering surplus material, and surplus material adhering to the front or top side of the belt within the device will be partially dislodged therefrom as the belt passes over the roller 56 at the top of the device 58 so that this surplus will fall downwardly into the open top of the device. Thus the top surface of the belt will be slightly coated with flour or similar material to which the extruded strip A of dough-like material will not readily adhere.

As the extruded strip of dough A passes from the extruder, it engages the upper floured surface of the conveyor belt 30 which is driven at the proper speed to receive the extruded material and convey it outwardly without drawing, rippling or compressing the material, and small measured portions B of meat, cabbage or other materials are deposited at intervals along and upon the extruded strip A. These small portions may be measured and deposited by a dipper-like device (not shown) such as the dippers commonly used for ice cream, salads, meats, and the like, the portions being deposited manually by operators at either or both sides of the conveyor.

Either before or after the small portions of filler are deposited upon the cover strip A, this cover strip is separated by cuts C to produce individual dumplings consisting of a substantially square portion D of the cover and one measured portion B of the filler. The cuts C may be produced by a knife-like blade 65 having a fixed block 67 in which one end of the blade is pivoted at one side of the belt 30 on the supporting frame 46. The blade is manually movable by means of a handle 69 at the other end which engages a limiting block 71 on the supporting frame 46 at the opposite side of the belt 30. This type of knife is shown in the patent to J. Blain, 1,005,128, issued October 10, 1911.

Figure 8:
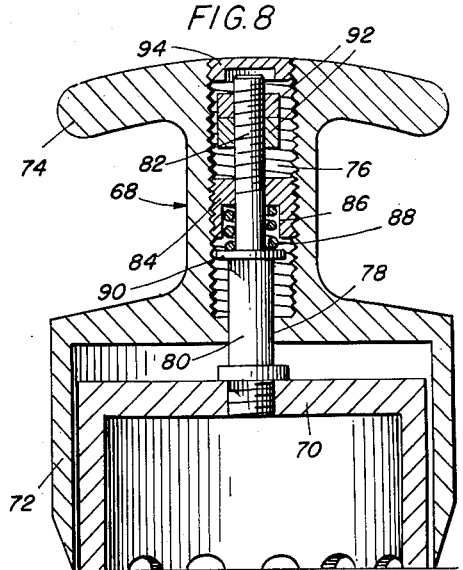
Fig. 8 is a sectional view of the device of Fig. 7 in another position.
Figure 9:
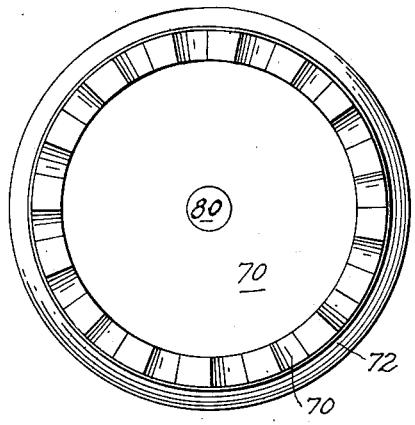
Fig. 9 is a plan view of the lower or cutting end of the crimping device of Fig. 7.

As the cover and filler units thus separated pass along the conveyor, a cutter and crimper 68 as shown in Figs. 7, 8 and 9 is applied to each dumpling unit and comprises a circular inner crimping member 70 movable within a circular outer cutting member 72. This outer cutting member is preferably formed with a reduced neck portion and an upper projecting hand hold 74. Extending centrally through the hand hold portion is a threaded bore 76 having a reduced portion 78 at the lower end. Secured centrally to the crimping member 70 is a stem 80 adapted to extend upwardly through the reduced opening 78 and into the threaded bore 76. The upper end of this stem 80 has a threaded portion 82 which extends through a collar 84 threaded into the bore 76. At one side of the collar is a recess 86 for seating a spiral spring 88 surrounding the stem and bearing at its lower end upon a washer 90 positioned on the stem and held in place by a shouldered portion of the stem. Near the outer end of the threaded stem 82 are two lock nuts 92 which are moved together on the stem to form an adjustable stop limiting the movement of the stem in the outer cutting member as shown in Figs. 7 and 8. At the top of the handle 74 and threaded into the end of the bore 76 is a cap 94 which closes the bore and makes a smooth end for the top of the handle.

The spring 88 tends to press the inner crimping member 70 downwardly from the lower cutting edge of the member 72 as shown in Fig. 7 and when in this position, the crimping edge will engage one of the cover portions D around a measured portion of the filler producing a scalloped edge depending upon the shapes of the crimping edge. If the handle of the cutter and crimper is then pressed downwardly as in Fig. 8, the cutting edge will engage the individual portion D of the cover and will cut this cover strip in circular form just outside of the circular crimped edge thereof. It is apparent that this cutter and crimper may be of different sizes and shapes instead of round; it may be oval, square, hexagonal and the like, both the crimping member and the cutting member being of substantially the same shape.

Figure 10:
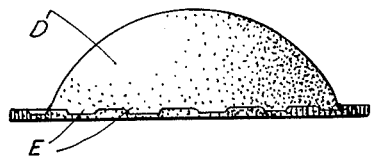
Fig. 10 is a side elevation of a cut and crimped pastry cover with a batch of filler thereon.
Figure 11:
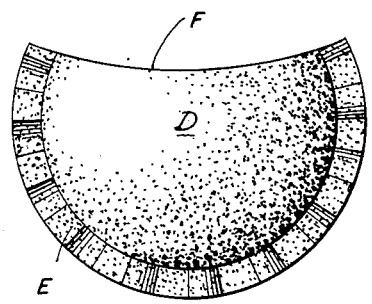
Fig. 11 shows the folded and completed form of a filled dumpling as produced by this method and apparatus.

In completing the dumpling, either side of the individual portion D of the cover is folded over the measured portion of the filler B until the top of the folded portion engages the opposite edge thereof to wholly enclose the filler in the cover. This operation may be performed manually by workers on either side of the conveyor. After the dumpling is thus folded, the cutter and crimper device is applied over the formed dumpling, the lower edge of the crimper engaging and compressing the edge of the dumpling surrounding the enclosed filler and forming a crimped edge E as shown more clearly in Figs. 10 and 11 with the folded edge F close to one side of the filler B, the dumpling then usually taking a segmental shape embracing more than a semi-circle as shown in Fig. 11. If the dumpling is crimped by folding it at one side, it may assume an arcuate shape such as the folded edge F as shown in this figure. The dumpling is distorted to its arcuate shape by the presence of the filler B and by the manual engagement of the dumpling in folding it. At the same time that the crimper portion is operated, the cutter 72 is pressed downwardly by means of the handle 74 which removes surplus material G at the corners and outside of the crimped portion. This material is the dough of the cover and may be replaced in the hopper 32 for reuse.

This produces a somewhat semi-circular bulging dumpling in which the filler is entirely covered and the circular crimped edges are pressed together. The dumpling may now be removed from the conveyor and is ready for cooking, freezing or marketing in the assembled form. The final operations of folding, crimping and cutting are effected manually by operators at either or both sides of the conveyor and the completed dumplings are then removed from the conveyor and placed in a tray or other receptacle.

The operations as thus described are therefore partly mechanical and partly manual, the extrusion of the dough-like cover being mechanical and continuous, delivering a finished strip of cover material upon the conveyor, the strip of dough is then cut into pieces and filler applied thereto or the filler is applied along the strip and the strip is cut between the portions of filler thereon. The cover is then folded to enclose the filler material and the edges of the dumpling thus folded are crimped and trimmed thereby completing the dumpling as it passes along to the end of the conveyor. The completed dumplings are removed and the scraps which are trimmed from the cover units are recovered and may be returned to the hopper so that none of this material is wasted.

Since the dumplings are folded by hand, it is not necessary that they be folded in the shape of a segment of a circle but opposite corners may be folded inwardly to form a somewhat rectangular dumpling, the crimped edges being finished together and being held in this position by the adherence of the portions of the dough-like cover which may be pressed into engagement with each other. Projecting portions of this dumpling may also be crimped and cut causing them to adhere together about the edge or edges if desired.

While this invention has been described in considerable detail, it should be regarded by way of illustration and example rather than a restriction or limitation thereof, as changes in the method and in the construction, combination and arrangement of the parts may be made without departing from the spirit and scope of the invention.

We claim:

1. In an apparatus for making dumplings, a conveyor comprising a movable belt, means for depositing thereon a continuous strip of dough-like cover material, means for cutting the cover material transversely into small individual pieces for receiving a measured quantity of food material, a crimping and cutting device for forming dumplings comprising an inner hollow member adapted to fit over the measured quantity of food on said individual pieces of cover material and having a crimping edge, an outer cutter fitting over the inner member and having a lower cutting edge, a handle in connection with the cutter and a stem extending from the inner member into the handle of the outer cutter member, the stem having a surrounding spring and stop nuts at the end thereof and the cutter member having an adjustable collar through which the stem extends separating the spring and the stop nuts and limiting the movement of the inner crimping member with respect to the outer cutter.

2. In an apparatus for making dumplings, a conveyor belt and means for feeding a continuous strip of dough-like material upon the belt, a flour holding receptacle through which the belt passes from bottom to top therethrough with one side of the belt resting against one side of the flour receptacle so that flour from within the receptacle adheres only to the other side of the belt which is the side exposed for receiving the dough-like material thereon, means for cutting the dough-like material into small individual pieces upon the conveyor which are suitable for receiving a measured amount of food material and prevented from adhering to the belt by the flour thereon, and a crimping and cutting device for engaging each of said pieces leaving enough of the material to enclose the food in the said individual pieces.

References Cited in the file of this patent

UNITED STATES PATENTS

| | | |
|---|---|---|
| 628,449 | Carr | July 11, 1899 |
| 738,242 | Romero et al. | Sept. 8, 1903 |
| 787,274 | Burns | Apr. 11, 1905 |
| 1,236,998 | Tomassini | Aug. 14, 1917 |
| 1,339,087 | Artkop | May 4, 1920 |
| 1,350,722 | Goodenberger | Aug. 22, 1920 |
| 1,575,213 | Kohler | Mar. 2, 1926 |
| 1,596,652 | Giovanetti | Aug. 17, 1926 |
| 1,643,143 | Wilcox | Sept. 20, 1927 |
| 1,695,427 | Helfgott | Dec. 18, 1928 |
| 1,858,507 | Jenney | May 17, 1932 |
| 2,409,021 | Dale | Oct. 8, 1946 |
| 2,440,655 | Hahn Jr. | Apr. 27, 1948 |
| 2,465,371 | Buechek | Dec. 14, 1948 |

FOREIGN PATENTS

| | | |
|---|---|---|
| 21,847 | Australia | Aug. 15, 1930 |
| 546,438 | Great Britain | July 14, 1942 |